Patented Feb. 14, 1933

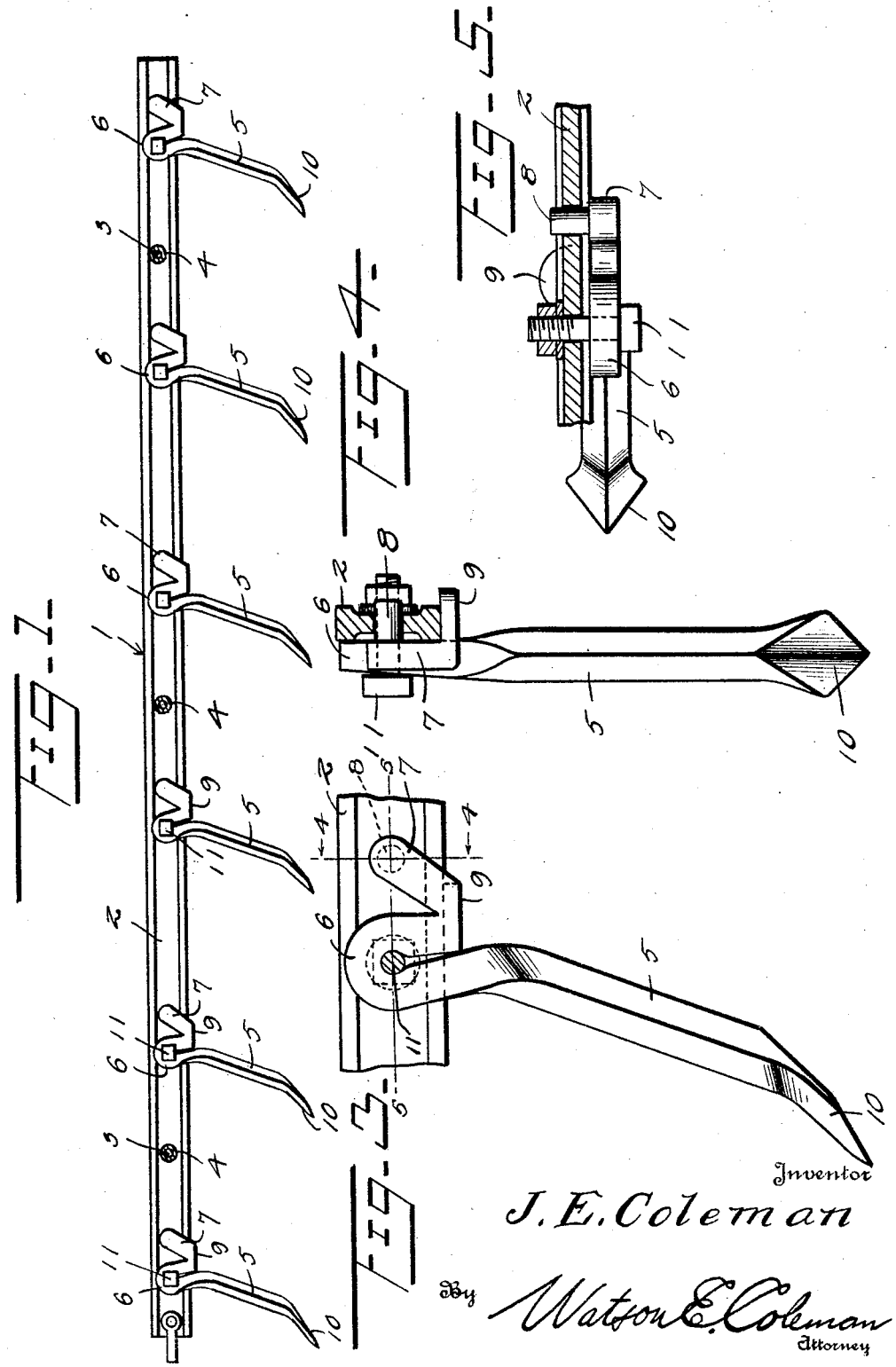

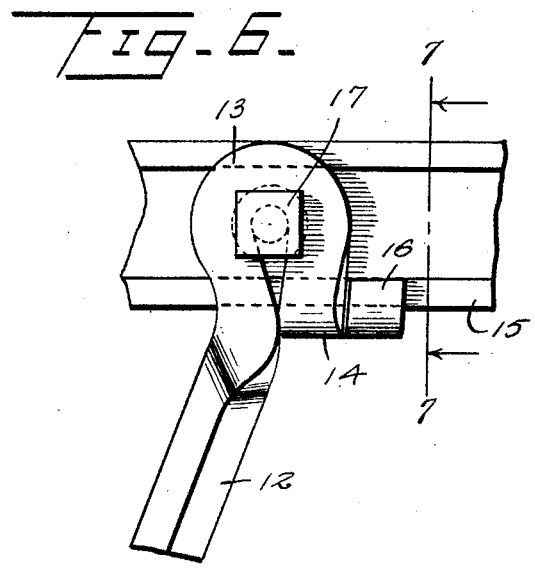
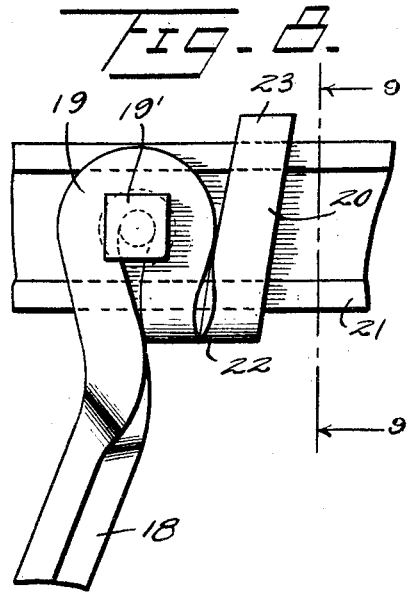
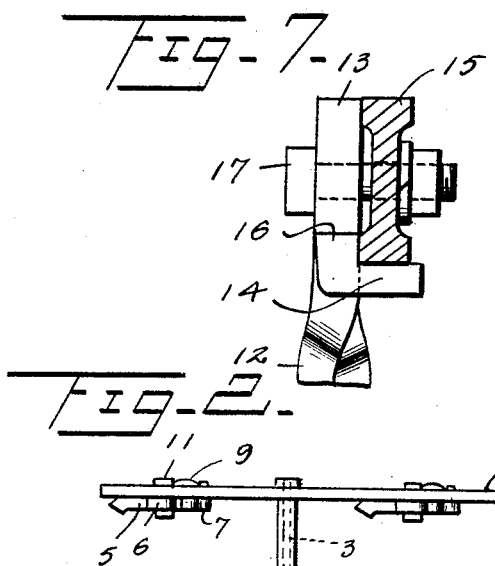
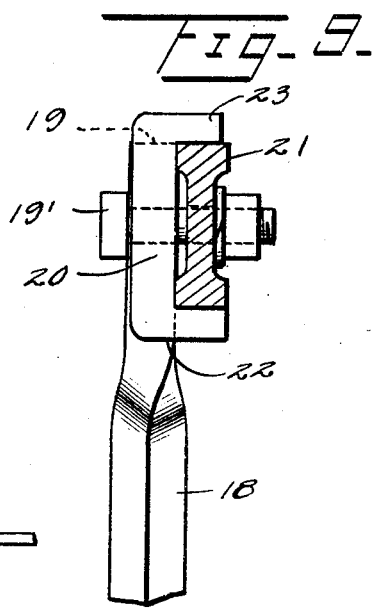
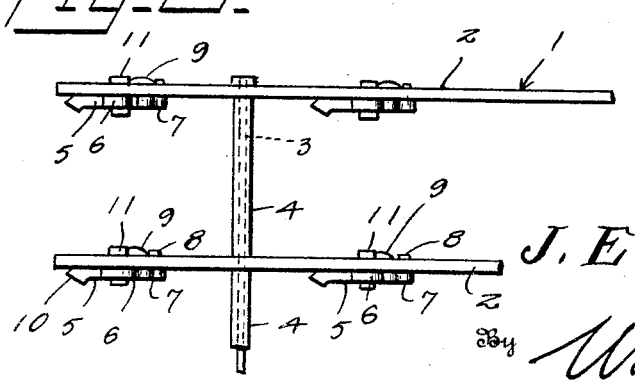

1,897,550

UNITED STATES PATENT OFFICE

JAMES E. COLEMAN, OF ALLENSVILLE, KENTUCKY

HARROW TOOTH

Application filed June 20, 1931. Serial No. 545,738.

This invention relates to earth working implements and pertains particularly to an improved type of harrow tooth.

The primary object of the present invention is to provide a novel harrow tooth formed in such a manner as to provide a bracing portion which may bear against the bar of the harrow to which it is attached so that it will be securely held in the proper position thereon.

Another object of the invention is to provide a harrow tooth having an integral member which is adapted to engage in an aperture in the face of the harrow bar upon which it is mounted so as to hold it in set position.

A still further object of the invention is to provide a harrow tooth formed of a single piece of material and bent in such a manner as to provide a bolt receiving eye and an extended portion integral therewith formed to engage a supporting harrow bar through which a bolt, passed through the eye, passes to maintain the tooth in a desired position on the bolt and with respect to the supporting bar.

The invention will be best understood from a consideration of the following detail description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in side elevation of a harrow showing the preferred form of the teeth embodying the present invention.

Figure 2 is a view in top plan of a portion of the harrow structure.

Figure 3 is an enlarged view in side elevation of the preferred form of the present harrow tooth.

Figure 4 is a sectional view taken on the line 4—4 of Figure 3.

Figure 5 is a sectional view taken on the line 5—5 of Figure 3.

Figure 6 is a view in side elevation of the upper portion of a second form of harrow tooth.

Figure 7 is a sectional view taken on the line 7—7 of Figure 6.

Figure 8 is a view in side elevation of the upper portion of a third form of tooth.

Figure 9 is a sectional view taken on the line 9—9 of Figure 8.

Referring now more particularly to the drawings, wherein like numerals of reference indicate corresponding parts throughout the several views, the numeral 1 indicates generally a portion of a harrow showing the application thereto of the preferred one of the several forms of teeth embodying the present invention.

This harrow consists of a series of bars 2 which may be arranged in the parallel manner shown or they may be disposed to form a V-shaped group as desired. In the form illustrated the bars are connected by rods 3 upon which are placed short lengths of tubular bodies 4 which are positioned between the bars 2 and serve to maintain them in the proper spaced relation.

The preferred one of the several forms of teeth illustrated is indicated by the numeral 5. This tooth is fashioned from a single bar of material and at its upper end it is bent back upon itself to form the eye 6, one side of which merges with the integral arm 7 which extends upwardly at an inclination rearwardly, as shown, and terminates in the laterally directed pin 8. At the point of joinder between the arm 7 and the eye 6, the material of which the tooth is fashioned is flattened out to form the laterally directed lip 9 which lies in a plane extending transversely of the longitudinal axis of the tooth. The body or shank of the tooth at the end opposite that where the eye 6 is formed is, in the present instance, flattened slightly and bent to form the forwardly projecting earth working point 10. It will, of course, be readily understood that in the place of this flattened angularly disposed tip, the shank may be made straight directly to its end and pointed like the usual harrow tooth.

For the application of teeth of the character indicated by the numeral 5, each of the bars 2 is provided with a series of pairs of apertures which are disposed longitudinally thereof and the eye 6 of the tooth is positioned against one face of the bar with the open center thereof arranged over one aperture so as to permit the passing of a securing bolt 11 therethrough.

The pin 8 upon the adjacent arm is engaged in the adjacent aperture and when the nut upon the bolt 11 is drawn up to secure the eye of the tooth against the adjacent bar, the pin will be forced into its aperture and the tongue 9 will engage under the lower edge of the bar 2 in the manner illustrated. The tooth will thus be securely attached to the supporting bar and held thereon by the tongue 9 and the pin 8 against displacement.

In Figure 6 there is illustrated another form of the present invention. In this form the shank 12 of the tooth is bent back upon itself adjacent its upper end, as indicated at 13, in the same manner as the tooth 5. However, one side of this loop or eye 13 is extended laterally and then bent back to form the portion 14 which lies against the lower edge of the bar 15 to which the tooth is secured and this laterally directed doubled portion of the tooth body terminates in the upturned tip 16 which engages the side face of the bar against which the eye 13 is positioned and secured by the bolt 17. The laterally directed double portion 14 of this second form of tooth thus operates to prevent oscillation of the tooth longitudinally of its supporting bar and the upturned tongue 16 operates to prevent any turning of the tooth.

Figure 8 illustrates still another form of the present harrow tooth, the body or shank of which is indicated generally by the numeral 18. The upper end of this tooth shank is bent or folded back upon itself, forming the eye 19 through which may be passed the supporting bolt 19'. One side of this eye has secured thereto the bar 20 which extends transversely of the harrow bar 21 to which the tooth is attached.

At the point of joinder between the bar 20 and the side of the eye 19, to which it is secured, there is formed the integral laterally directed lip portion 22 which extends across the lower edge of the bar 21, while the upper end of the tooth carrying bar 20 is turned at an angle to form the laterally extending portion 23 which engages across the top edge of the harrow bar 21.

From the foregoing description it will be readily seen that the harrow teeth herein described may be easily and quickly applied to a bar of the harrow frame and because of their peculiar formation they will be firmly held against movement upon the bolts by which they are secured to the harrow bar.

Having thus described the invention, what is claimed is:

1. In a harrow having tooth supporting bars, a tooth comprising a shank bent back upon itself adjacent one end to form an eye, a laterally directed tongue forming an integral part of said eye and adapted to position against the lower edge of the harrow bar when the eye is arranged against one face thereof, and a bracing element formed integral with said tongue and arranged to engage against the same face of the bar as that engaged by the eye.

2. In a harrow having a tooth supporting bar, a tooth consisting of a shank, an eye formed at one end of said shank for the reception of a supporting bolt extended through the harrow bar, an arm formed integral with said eye and arranged to position against the same side of the bar as the eye, a pin member carried by said arm adapted to engage in an aperture in the bar, and a tongue member formed integrally with said arm and eye for engaging across an edge of the tooth supporting bar.

3. A harrow tooth, comprising a shank having a portion of one end bent back upon itself to form a supporting bolt receiving eye, a tongue forming a lateral continuation of one side of said eye, and an arm forming a continuation of said tongue and adapted to extend over a face of a supporting harrow bar, said arm being in the same plane as the eye.

4. A harrow tooth, comprising a shank having a portion of one end bent back upon itself to form a supporting bolt receiving eye, a tongue forming a lateral continuation of one side of said eye, an arm forming a continuation of said tongue and adapted to extend over a face of a supporting harrow bar, said arm being in the same plane as the eye, and a pin member carried by the arm for engaging in an aperture in the supporting harrow bar.

5. A harrow tooth, comprising a shank having a portion of one end bent back upon itself to form a supporting bolt receiving eye, a tongue forming a lateral continuation of one side of said eye, an arm forming a continuation of said tongue and adapted to extend over a face of a supporting harrow bar, said arm being in the same plane as the eye, and an angularly disposed portion forming a terminal continuation of said arm, adapted to engage across the edge of the harrow supporting bar opposite that across which the tongue extends.

6. In a harrow having a tooth supporting bar, a tooth consisting of a shank, an eye forming an integral bent back continuation of the shank at one end, a tongue forming a laterally extending loop having one end integral with the eye and having its other end terminating in the plane of the eye, and an arm forming a continuation of the said other end of the loop and directed vertically in the same plane as the eye.

7. In a harrow having a tooth supporting bar, a tooth consisting of a shank, an eye forming an integral bent back continuation of the shank at one end, a tongue forming a laterally extending loop having one end integral with the eye and having its other end terminating in the plane of the eye, an arm forming a continuation of the said other end of the loop and directed vertically in the same plane as the eye, said arm being of a length to extend across the tooth supporting bar, and a right angularly extending portion forming a continuation of the arm designed to overlie the top of the bar in a plane parallel with the tongue.

8. A harrow tooth, comprising a shank having a flat eye formed at one end and forming a continuation of the shank, a relatively broad tongue formed integral with said eye and projecting to one side thereof in a plane at right angles to the shank, an arm formed integral with said tongue and lying in the same plane as the eye, and a pin carried by the arm adjacent its free end for engagement in an aperture of a harrow tooth supporting bar to which the eye may be secured.

In testimony whereof I hereunto affix my signature.

JAMES E. COLEMAN.